E. AMODEO-SALVATOR.
VEHICLE WHEEL.
APPLICATION FILED NOV. 6, 1913. RENEWED SEPT. 17, 1915.
1,191,866.                                      Patented July 18, 1916
                                                      2 SHEETS—SHEET 2.
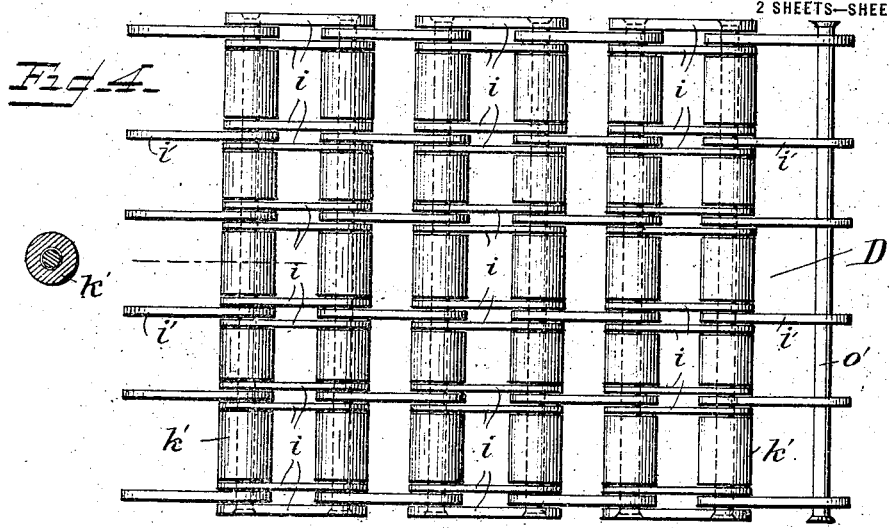
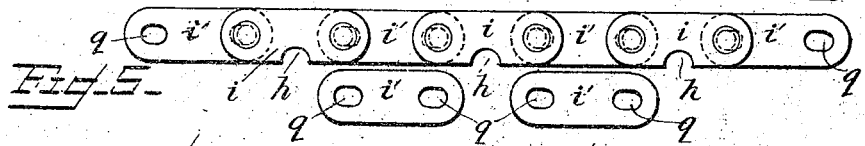
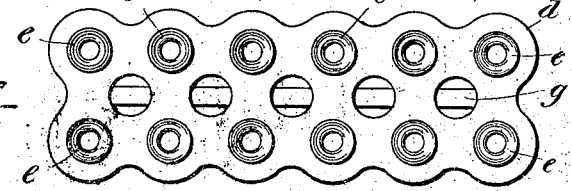
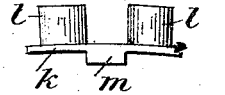
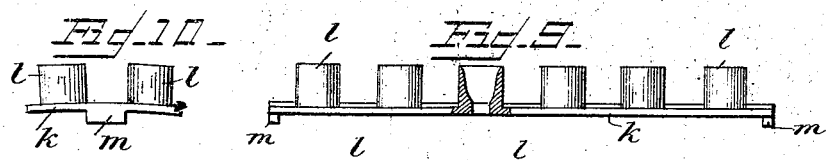
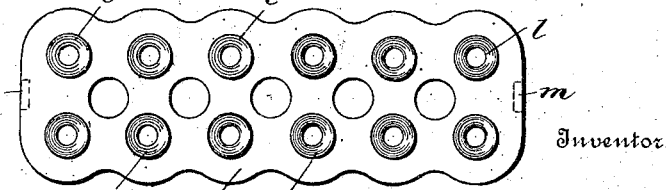

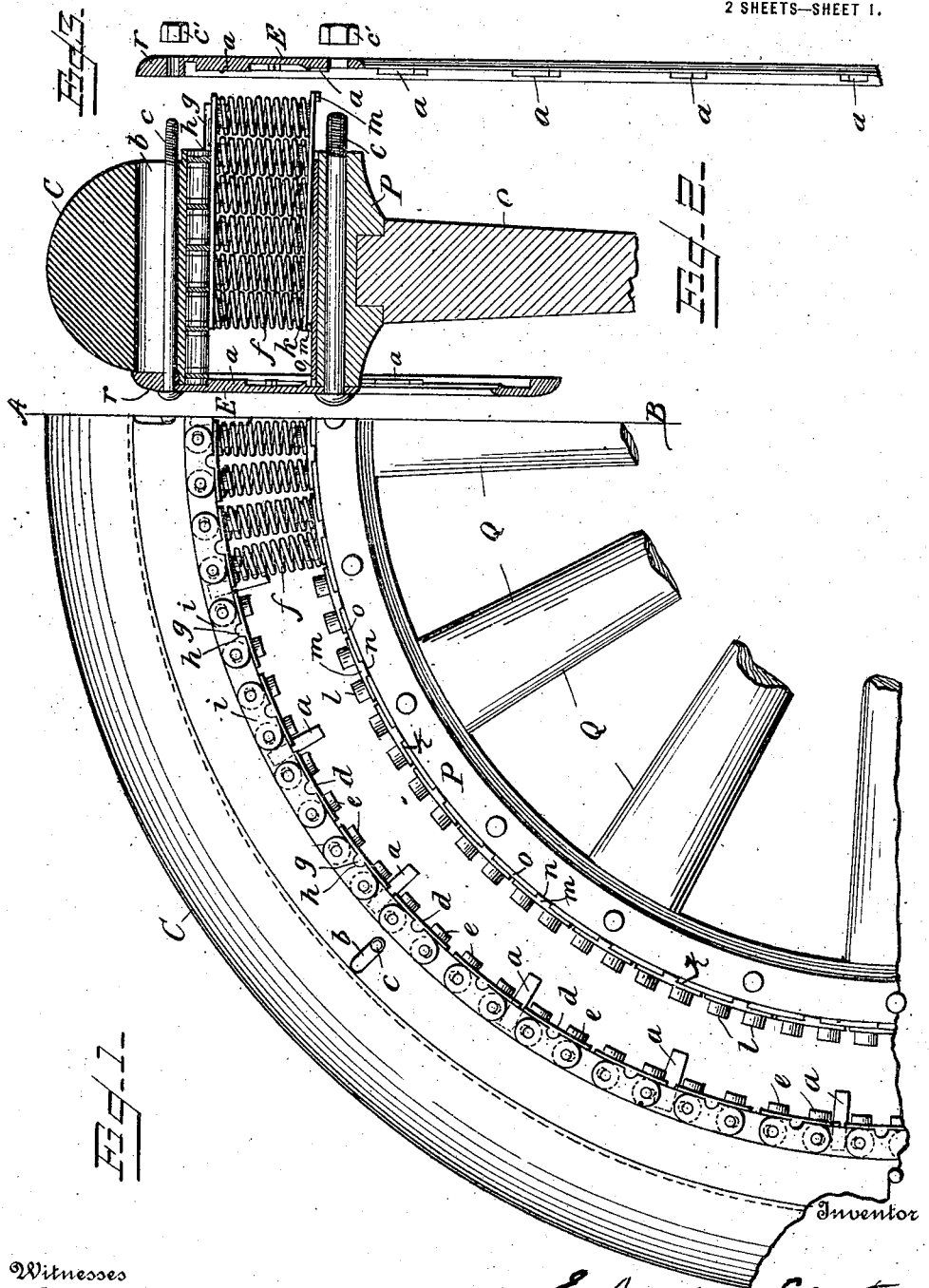

UNITED STATES PATENT OFFICE.

EMMANUEL AMODEO-SALVATOR, OF BROOKLYN, NEW YORK.

VEHICLE-WHEEL.

1,191,866.   Specification of Letters Patent.   Patented July 18, 1916.

Application filed November 6, 1913, Serial No. 799,572. Renewed September 17, 1915. Serial No. 51,285.

*To all whom it may concern:*

Be it known that I, EMMANUEL AMODEO-SALVATOR, a citizen of the United States, residing at Brooklyn, in the county of Kings and State of New York, have invented certain new and useful Improvements in Vehicle-Wheels; and I do hereby declare the following to be a full, clear, and exact description of the invention, such as will enable others skilled in the art to which it appertains to make and use the same.

My present invention relates to vehicle wheels, has especial reference to automobile and like wheels, has for its object the production of a wheel possessing great resiliency for absorbing shocks and increased durability.

The invention consists in certain improvements of construction which will be fully disclosed in the following specification and claims.

In the accompanying drawings, which form part of this specification:—Figure 1 represents a side elevation partly in section of a segment or part of a wheel embodying my invention. Fig. 2 is a cross section partly in elevation on line A—B, Fig. 1, showing one clamping-plate detached and a cage of resilient members partly inserted on the rim of the wheel. Fig. 3 is a transverse section partly in elevation showing part of one of the clamping-plates detached. Fig. 4 is a top plan view of a section of the flexible member adjacent to the tire. Fig. 5 is a side view of the same. Fig. 6 is a side view of the keeper. Fig. 7 is an end view of the same. Fig. 8 is an inverted plan view of the same. Fig. 9 is a side view of the springs supporting-bar. Fig. 10 is an end view of the same and Fig. 11 is a top plan view of the same.

Reference being had to the drawings and the designating characters thereon, P indicates the felly, and Q the spokes of a conventional wheel, surrounded by a metallic rim $o$ resting on the felly, and in the edges of said rim are notches $n$ to receive projections or lugs $m$ on the ends of the supporting-bars $k$. The bars $k$ are provided with vertical spuds $l$, which enter the lower ends of the spirally wound springs $f$ and hold them in position on said bar.

$d$ indicates the keepers which are also provided with vertical, but downward extending spuds $e$ which engage the upper ends of the springs $f$ for a like purpose as the spuds on the bar $k$. Each opposite pair of bars $k$ and keepers $d$ support a plurality of springs $f$, which extend across the felly and the rim $o$, and thus distribute the weight of the vehicle and its load evenly upon all the springs, which form a resilient cushion for the solid rubber tire C.

D indicates a flexible member surrounding the springs $f$ and is composed of links $i$, $i$ arranged in groups of three, as shown in Fig. 4, between each of which groups is a thimble or spacing member $k'$ which holds the links in proper relation and prevents lateral movement thereof. The links and the thimbles are mounted upon transverse pivots or rods $o'$, which are upset or riveted at their ends to secure them in the links.

The links $i$ are provided with recesses or transverse grooves $h$ which are engaged by a rib or projection $g$ on each of the keepers $d$ and thus join or connect the springs $f$ with or to said flexible member, and also prevent the spring sections of the wheel moving circumferentially within the flexible member, or being displaced therein. The ribs $g$ extend the length of the keepers $d$.

The links $i'$ are provided with elongated openings $q$ at their ends to accommodate the flexure of the member D, due to changes in the load or the shock received in passing over uneven places in the road bed.

E indicates the clamping-plates on each side of the wheel, which are secured in position by transverse bolts $c$ and nuts $c'$. The inner bolts pass through the felly, and the outer bolts extend through reinforces $r$ in the clamping-plates and through elongated slots $b$ in the elastic tire C, to accommodate the resiliency of the tire.

On the inner sides of the clamping-plates E are radially arranged laterally projecting members or lugs $a$ which extend between adjacent ends of the links $i$ and prevent circumferential movement of the flexible member and the inclosed springs $f$, as shown in Fig. 1.

Each cage or set of springs $f$ formed by the supporting-bar $k$ and keeper $d$ are laterally insertible and removable in the wheel, to facilitate assembling of the wheel and repairs, such as renewing the springs.

The reinforces $r$ at the perimeter of the clamp-plates E, serve to take the lateral thrust of the tire C, due to skidding or rounding corners in the roadway.

The tension or torsion of the springs $f$ is varied according to different sized wheels and the load they are required to support, but in each instance the springs are made of comparatively light wire so that they will yield readily and evenly under the load, absorb all shocks and produce easy riding for the occupants of the vehicle.

The construction shown and described provides a wheel of great durability, capable of absorbing shocks incident to use, and the reinforces on the clamping-plates keep the tire in proper alinement by preventing the tire being pushed or pressed to either side of the normal position and throwing an excess of weight upon the resilient members on either side of the transverse center of the rim of the wheel, thus keeping the weight evenly distributed on all the springs subject to weight in the revolution of the wheel.

Having thus fully described my invention, what I claim is:—

1. A vehicle wheel comprising a felly, a rim surrounding the felly and provided with notches in its edges, pairs of opposing members extending across the rim, the inner ends for engaging said notches, a plurality of springs between said members and extending throughout their length, a concentrically arranged flexible member surrounding the springs, a tire, and guide flanges.

2. A vehicle wheel comprising a felly, a rim surrounding the felly and provided with notches in its edges, a guide flange on each side of the wheel, laterally removable resilient members arranged in pairs and extending across the felly, and filling the space between said guide flanges, supports for said members forming cages and the inner supports engaging the notches in said rim, a flexible member surrounding said resilient members and connected thereto, a tire, and inwardly extending projections on the guide flanges engaging said flexible member coacting with said notches and inner supports engaged therein to retain the resilient members against circumferential movement.

3. A vehicle wheel comprising a felly, opposing members, a plurality of springs between said members, the outer members having projections on their outer surfaces, a continuous flexible member composed of links, each alternate pair of links having transverse grooves engaging said projections, a tire, and clamping-plates.

In testimony whereof I affix my signature, in presence of two witnesses.

EMMANUEL AMODEO-SALVATOR.

Witnesses:
WALTER W. HEAD,
SAMUEL JOHNSTON.

Copies of this patent may be obtained for five cents each, by addressing the "Commissioner of Patents, Washington, D. C."